Nov. 3, 1936.    J. L. HECHT    2,059,346
METHOD OF MAKING METAL WHEELS
Filed April 14, 1934
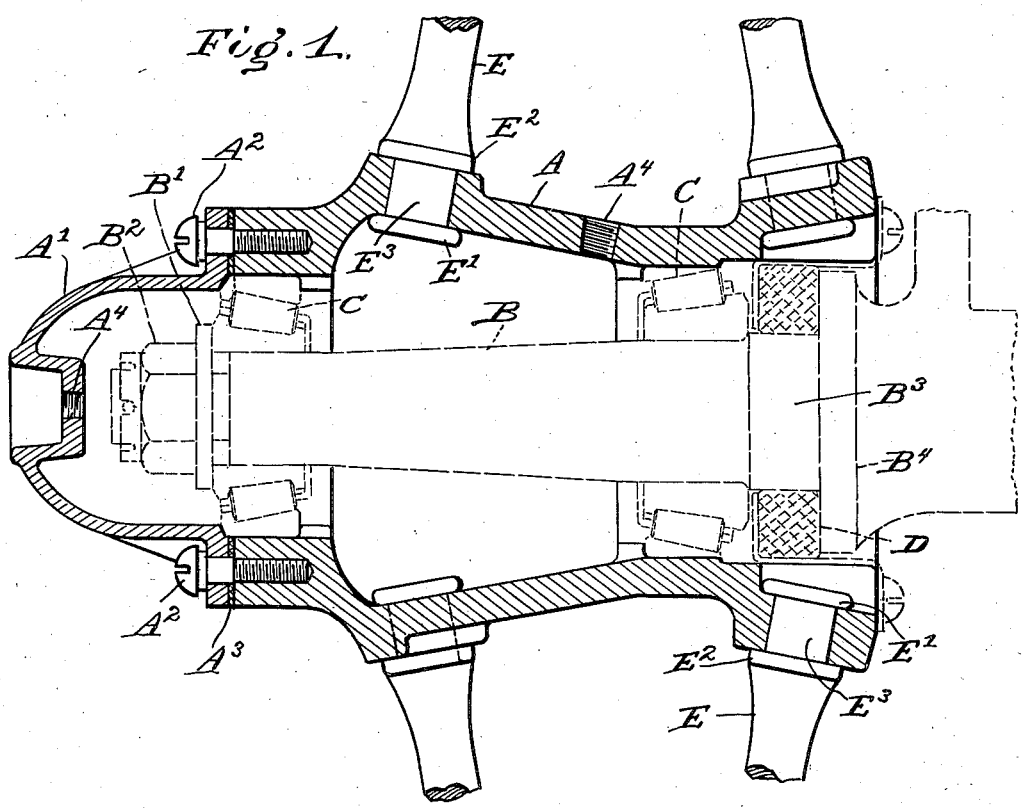
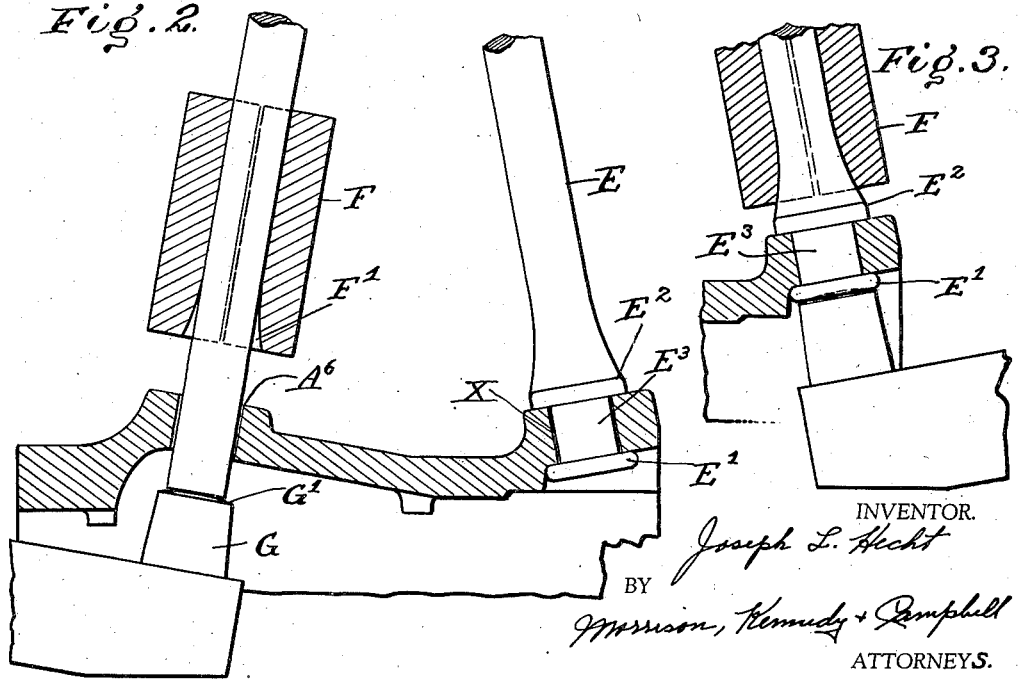
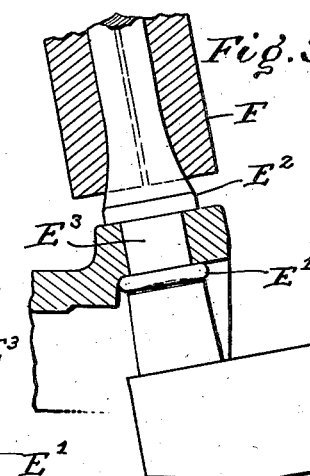
INVENTOR.
Joseph L. Hecht
BY Morrison, Kennedy & Campbell
ATTORNEYS.

Patented Nov. 3, 1936

2,059,346

UNITED STATES PATENT OFFICE 2,059,346

METHOD OF MAKING METAL WHEELS

Joseph L. Hecht, Davenport, Iowa, assignor to French & Hecht, Incorporated, a corporation of Iowa Application April 14, 1934, Serial No. 720,542

3 Claims. (Cl. 29—159.02)

This invention relates to a method of securing metal parts of a wheel together to obtain a tight connection, which will more effectively resist a tendency to wear and loosen from use. More particularly, the invention relates to the manufacture of wheels wherein the spokes are anchored in the hub and rim by having their ends upset while hot.

It has been found that wheels manufactured in such manner are not satisfactory for many reasons. When the spoke end cools, after being upset, the degree of contraction of the spoke end is greater than that of the surrounding region of the rim or hub in which it is anchored, and, hence, unless the spokes are under tension, as, for example, in a wheel of the type disclosed in Letters Patent of the United States Nos. 1,904,453 and 1,934,537 to Joseph L. Hecht, their connections with the hub and rim soon become loose. On the other hand, even if the spokes are tensioned, as in the patents referred to, it has been found that the connection of the spokes with the hub is not satisfactory when pressure lubrication of the axle shaft and wheel bearings is employed, due to leakage of the lubricant around the ends of the spokes secured in the hub. This leakage results from the failure of the spoke ends to fill completely or solidly the recesses or sockets in the hub in which they are fitted, because of the fact that although by the upsetting action the recesses are completely and solidly filled by the portions of the spokes passing through them, upon cooling, as already pointed out, the degree of contraction of the spokes is greater than that of surrounding regions of the hub, and, hence, a space exists between each spoke and the hub through which the lubricant under pressure is forced.

In accordance with the present invention, the objectional feature of looseness is obviated by an additional step in the method of manufacture, which consists in further upsetting the ends of the spokes after they have cooled to fill so completely or solidly the recesses in the hub and rim in which they are fitted as to form tight connections, and effectively seal against the leakage of the lubricant at the points of anchorage in the hub.

As a feature of the invention, the subsequent upsetting of the spoke ends when cold is accomplished by the use of the same means employed to effect the initial upsetting of the spoke ends when heated.

In the acompanying drawing, the invention has been shown merely by way of example and in preferred form, and obviously many modifications and variations thereof may suggest themselves to those skilled in the art which will still be comprised within its spirit. It is to be understood, therefore, that the invention is not limited to a particular mode of application except in so far as such limitations are specified in the appended claims.

Referring to the drawing:

Fig. 1 is a sectional view of the hub portion of a wheel, showing spoke ends anchored therein in accordance with the present invention;

Fig. 2 is a sectional view of a fragment of the wheel hub and spoke end upsetting means at one stage of manufacture; and Fig. 3 is a sectional view of a fragment of the wheel hub and spoke end upsetting means at a subsequent stage of manufacture.

For a complete understanding of the invention, it is necessary only to describe it in connection with the method of upsetting one end of the spokes, whether anchored in the rim or the hub. Therefore, the invention is illustrated and described herein in connection with the ends of the spokes anchored in the hub of the wheel.

Referring particularly to Fig. 1 there is illustrated the hub portion of a wheel typical of that type of wheel whose construction and manner of mounting on the axle shaft permits of pressure lubrication. The hub A is mounted on an axle shaft B (which with its associated parts is shown in phantom) on bearings C arranged one adjacent the inner and outer ends of the axle shaft. Through the medium of the outer bearing C, the hub is held on the axle shaft by means of a washer $B^1$ and nut $B^2$. At its inner end, the axle shaft B is formed with a surface $B^3$ and flange $B^4$, which together form a seat for a sealing washer D of felt or other suitable material. In the embodiment illustrated, a hub cap $A^1$ is secured by screws $A^2$ to the hub A, a gasket $A^3$ being employed to seal the connection between the hub and hub cap. In both the hub and cap, there are drilled recesses $A^4$, tapped to receive pressure lubrication fittings, whereby a lubricant for the bearings C may be injected under pressure, the escape of the lubricant being prevented by the sealing washer D and gasket $A^3$.

Obviously there are a great many other forms of hub construction and wheel mounting and it is to be understood that the embodiment shown in Fig. 1 is merely illustrative of a mounting sealed for the purpose of pressure lubrication commonly employed for vehicle wheels.

As already stated, in the manufacture of metal wheels according to the practice heretofore, the spoke ends are anchored in the hub by an upsetting action while heated, either for the purpose of creating a tension of the spokes by their contraction in cooling or merely to facilitate the upsetting of the spoke ends. A common method employed to upset the ends of the spokes is that illustrated in United States Letters Patent No. 1,904,458, already referred to, and for the purpose of the instant disclosure this method will be followed. With reference to Fig. 2, the method consists in arranging concentrically with one another the hub and rim which are to be joined together. Spokes E are then assembled in the rim in recesses provided for their reception with their previously headed end portions spaced somewhat from the periphery of the rim. The headless end of each spoke E is in turn heated and inserted through a hole or recess $A^6$ in the hub A, but not sufficiently for the headed end of the spoke to firmly engage the periphery of the rim. An upsetting clamp F, having a flared end $F^1$ is secured to the spoke E a short distance from the outside of the hub, as illustrated in Fig. 2, and an upsetting head G, having a rounded spoke engaging surface $G^1$ for concentrating the pressure centrally of the spoke end, is engaged with the end of the spoke within the hub. These two upsetting members are moved toward each other by powerful pressure means (not shown) with the result that the end of the spoke within the hub is upset to form a head $E^1$, and at the same time a shoulder $E^2$ is formed at the outside of the hub by virtue of the metal of the spoke filling the flared end $F^1$ of the clamping member F, while the portion $E^3$ of the spoke passing through the recess $A^6$ in the hub is expanded to fill the recess. In the upsetting action, the material of the spoke going into the head $E^1$ and shoulder $E^2$, and the expansion of the portion $E^3$ to fill the recess $A^6$, causes a shortening of the spoke to draw the opposite headed end thereof into engagement with the periphery of the rim. Upon cooling, contraction of the spoke effects the desired tensioning thereof, although, of course, it will be understood that it is not until the last spoke is acted upon by the upsetting means and allowed to cool that the actual tensioning of the wheel will be completely effected.

In the manufacture of wheels according to this method, a tight engagement of the head $E^1$ and shoulder $E^2$ of each spoke with the inner and outer surfaces of the hub A is obtained by the upsetting action and, further, by the lengthwise contraction of the spoke upon cooling. However, the degree of lateral contraction of the portion $E^3$ of the spoke passing through the recess $A^6$ is greater than the degree of contraction of the surrounding region of the hub, which has been heated and caused to expand slightly only by the presence of the contiguous heated spoke end. Hence, a space X exists between the portion of the spoke $E^3$ and the surrounding region of the hub or wall of the recess $A^6$. The existence of this space X is objectionable in wheels adapted for pressure lubrication, since it has been found that the space X coupled with the failure of the head $E^1$ and shoulder $E^2$ of the spoke to effect a leak-proof seal with the hub is sufficient to permit the leakage of a lubricant under pressure therethrough.

In accordance with the present invention, after the heated end of the spoke E anchored in the hub A has been subjected to the action of the upsetting members F and G, it is allowed to cool and then again subjected to the action of the same upsetting means operated by the same pressure means. Because of the rounded spoke engaging surface $G^1$ of the member G, during this subsequent upsetting action of the cold spoke end the pressure of the head G is, as before, concentrated centrally of the spoke end and thus acts most effectively to expand the portion $E^3$ to fill completely or solidly the recess $A^6$ (see Fig. 3). Since the spoke end is cold when this upsetting action takes place and there is no contraction of the spoke end, the space X is eliminated and a leakproof anchorage of the spoke in the hub is effected.

It is not essential that the complete method of manufacturing a wheel be carried out in accordance with the particular steps and in the particular sequence and manner already set forth, in order to come within the scope of the invention, or that the steps in the method of manufacture constituting the present invention be confined to a method of manufacturing tension wheels, since they may be included in a method of manufacturing wheels wherein the spokes are not tensioned. Moreover, as stated heretofore, the invention applies equally well to the method of connecting the spoke ends to the rim of the wheel in order to obtain a solid anchorage. Furthermore, the invention is not limited to spoked wheels, but is equally applicable to the anchorage of any suitable means for connecting the rim and hub of a wheel when the connection is made by acting upon the parts first when hot and subsequently when cold to secure a more firm connection.

Having thus described my invention, what I claim is:

1. In the manufacture of a wheel wherein the spokes are heated to enable them to be upset to form a connection with the hub of the wheel, the method of fastening a spoke to the hub to provide a sealed connection therewith, including as steps, inserting the heated end of the spoke in a hole extending through the wall of the hub, upsetting the spoke end to connect the spoke with the hub and to swell out the portion of the spoke passing through the hole in the hub wall to fill said hole completely, allowing the upset spoke end and surrounding region of the hub to cool and contract until all shrinkage of the parts has taken place, whereby a space is created between the spoke and surrounding hub wall defining said hole, and then upsetting the spoke end while cold to swell out the portion thereof passing through said hole and fill completely the space between the spoke and the hub created by the shrinkage due to cooling.

2. In the manufacture of a wheel wherein the spokes are heated to enable them to be upset to form a connection with the hub of the wheel, the method of fastening a spoke to the hub to provide a sealed connection therewith, including as steps, the insertion of the heated end of the spoke in a cylindrical hole formed in the wall of the hub, upsetting the spoke end to connect the spoke with the hub and to swell out the portion of the spoke passing through the hole in the hub wall to fill said hole completely, allowing the upset spoke end and surrounding region of the hub to cool and contract until all shrinkage of the parts has taken place, whereby a space is created between the spoke end and surrounding hub wall defining said hole, and then upsetting the spoke end while cold to swell out the portion thereof passing through said hole and fill completely the space between the spoke and the hub created by the shrinkage due to cooling.

3. In the manufacture of a wheel wherein the spokes are heated to enable them to be upset to form a connection with the hub of the wheel, the method of fastening a spoke to the hub to provide a sealed connection therewith, including as steps, inserting the heated end of the spoke in a cylindrical hole formed in the wall of the hub, upsetting the spoke end to form shoulders abutting the inner and outer sides of the wall of the hub and to swell out the shank of the spoke between the shoulders to fill completely the hole through which it passes, thereby forming the connections of the spoke with the hub, allowing the upset spoke end and surrounding region of the hub to cool and contract until all shrinkage of the parts has taken place, the shrinkage drawing the shoulders into tight engagement with the hub wall but creating a space between said shank and surrounding hub wall, and then upsetting the spoke end while cold to swell out said shank and fill completely the space between the spoke and the hub created by the shrinkage due to cooling, the shoulders and shank together forming a sealed connection of the spoke with the hub.

JOSEPH L. HECHT.